March 25, 1930.    G. C. CARHART    1,752,062
TRANSMISSION MECHANISM
Filed March 8, 1926    2 Sheets-Sheet 1

INVENTOR.
George C. Carhart
BY
Parsons & Birdell
ATTORNEYS.

March 25, 1930.  G. C. CARHART  1,752,062
TRANSMISSION MECHANISM
Filed March 8, 1926  2 Sheets-Sheet 2
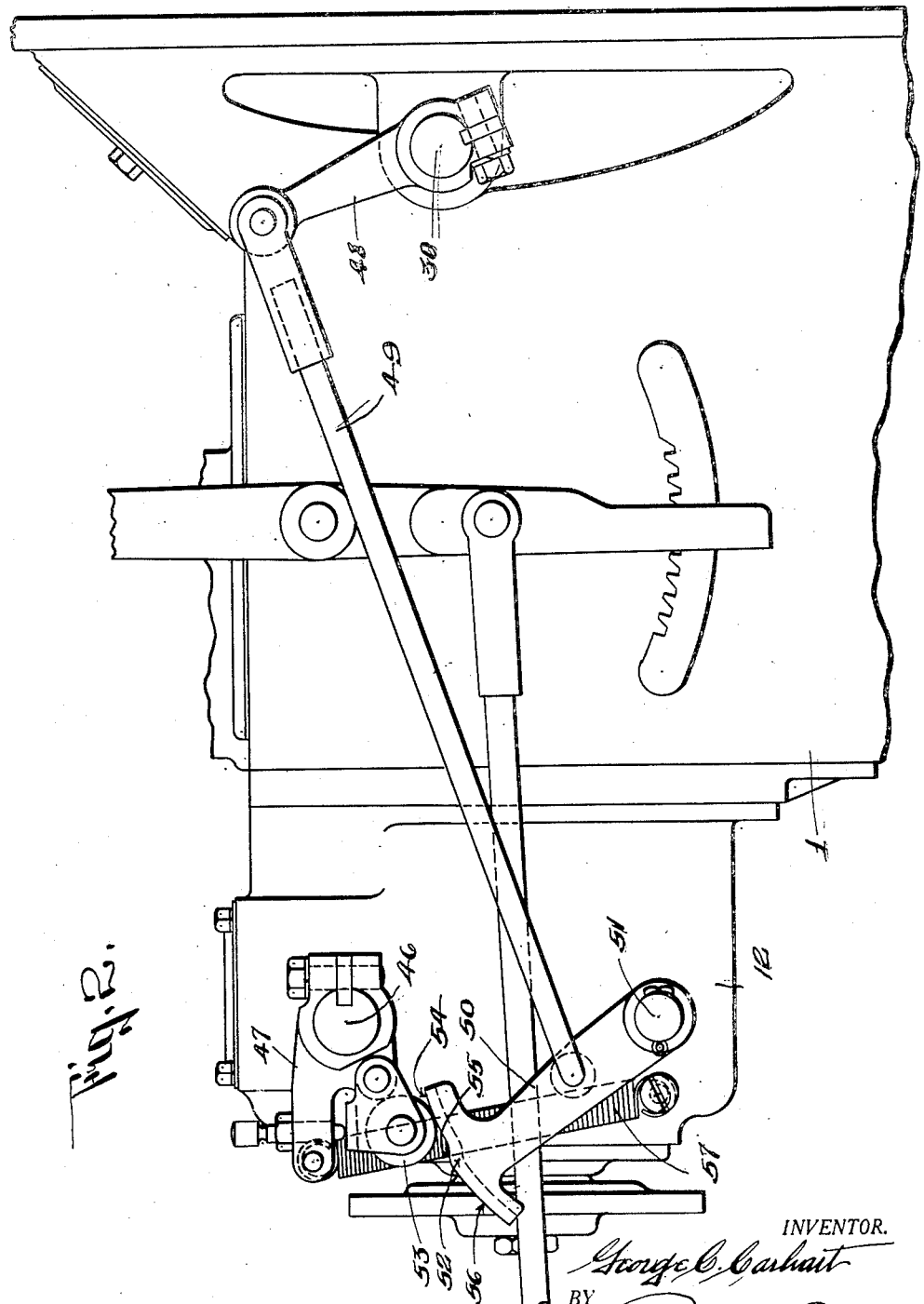
INVENTOR.
George C. Carhart
BY
Parsons & Bodell
ATTORNEYS.

Patented Mar. 25, 1930

1,752,062

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

TRANSMISSION MECHANISM

Application filed March 8, 1926. Serial No. 93,101.

This invention relates to transmission mechanisms such as are used in motor vehicles, and has for its object a particularly simple and efficient combination of clutch mechanisms for connecting and disconnecting a prime mover as the engine and the drive shaft of the transmission gearing and for connecting and disconnecting the driven shaft of such gearing and the propeller shaft driver, which clutches are so combined together with their operating means that practically no more force is required on the part of the operator to throw out the main clutch and the rear clutch preliminary to gear shifting operations than has heretofore been required to throw out the main clutch.

The invention consists in the novel features and in the combinations and constructions hereinafter set forth and claimed.

In describing this invention, reference is had to the accompanying drawings in which like characters designate corresponding parts in all the views.

Figure 2 is an enlarged fragmentary elevation of parts seen in Figure 1, showing particularly the operating means for the clutches.

Figure 1:
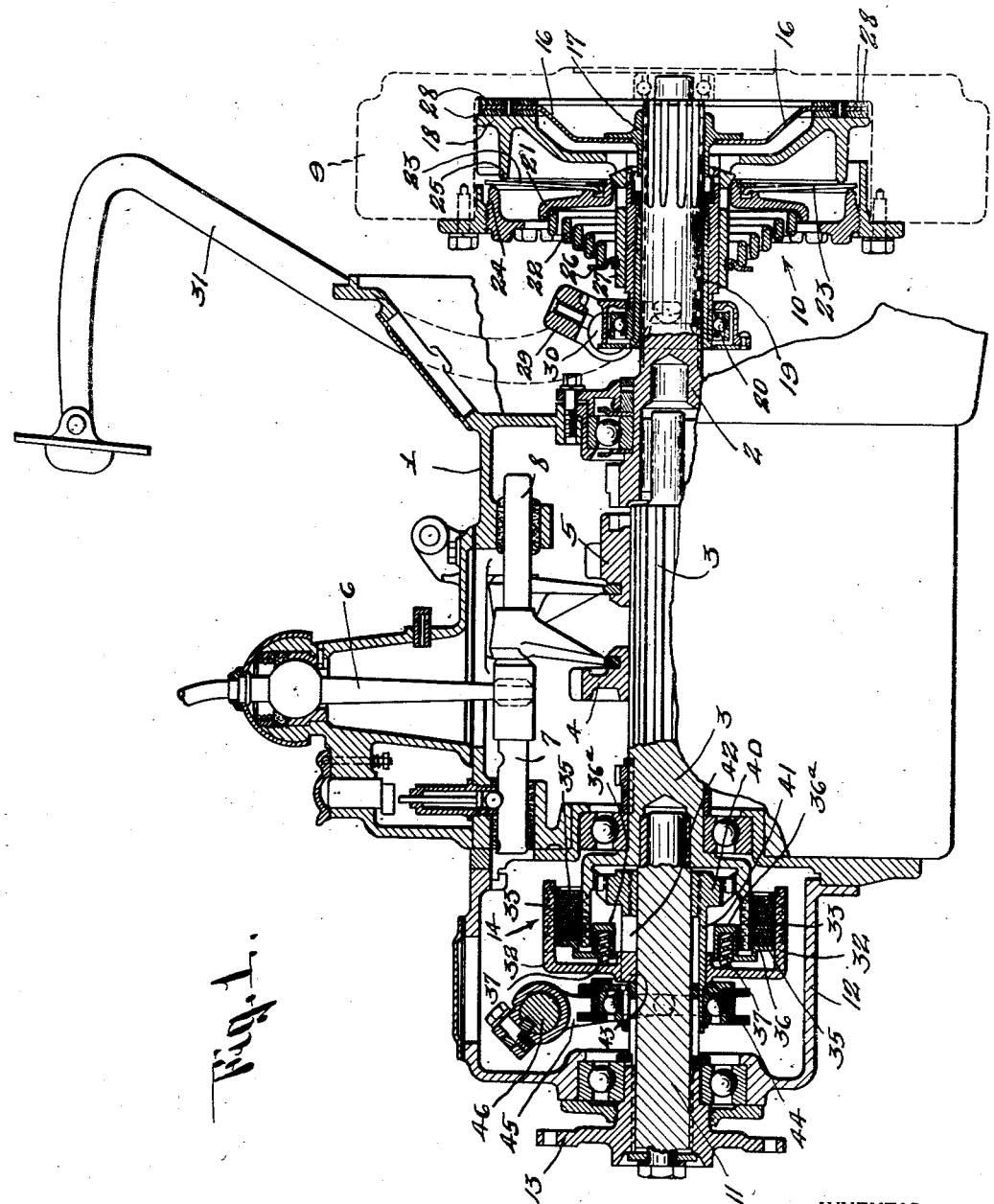
Figure 1 is a longitudinal sectional view, partly in elevation and partly broken away, of a transmission mechanism embodying my invention.

This transmission mechanism comprises, generally, a gear set including the usual casing in which is mounted a drive shaft, a driven shaft, a countershaft, gears between said shafts, some of which are shiftable and means for shifting the gears, a prime mover as an engine or the fly wheel thereof, a main clutch between the prime mover and the driving shaft of the gearing, an auxiliary or rear clutch between the driven shaft and the propeller shaft driver, means for throwing out the clutches, connections between the throw-out means for the main and the rear clutches whereby both are operated by the same operation, the front clutch being constructed so that maximum friction is obtained from a comparatively light spring and minimum effort on the part of the operator is required to throw out the clutch against the light spring and also so that the rear clutch does not require an appreciable extra effort on the part of the operator. The extra effort that would otherwise be required being further avoided by the use of a lost motion connection between the throw-out means for the clutches whereby although both clutches are operated at the same operation, they are thrown out successively.

1 designates the case of the transmission gearing or gear set.

2 and 3 are respectively the driving and driven shafts which are journalled respectively in the front and rear walls of the case, the driven shaft having a pilot bearing at its front end in the rear end of the driving shaft.

4 and 5 designate the shiftable gears which are operated by a suitable selecting and shifting lever 6 coacting with the slide rods having forks 7 and 8 respectively coacting with the gears 4, 5. The construction of the gearing itself forms no part of this invention and it is thought that further description of the gearing is unnecessary especially as this type of gearing is well understood.

9 is the prime mover or the fly wheel of the engine.

10 designates generally the friction main clutch between the fly wheel 9 and the driving shaft 2.

11 designates the propeller shaft driver alined with the driven shaft 3 and journalled at one end in a wall of a case 12 suitably mounted on the rear wall of the transmission gear case 1 and at its other end having a pilot bearing in the rear end of the driven shaft 3. The propeller shaft driver is provided with suitable means for coupling it to the propeller shaft of a motor vehicle, a portion of a universal joint being shown at 13.

14 designates the auxiliary or rear clutch for connecting and disconnecting the driven shaft 3 and the propeller shaft driver 11.

The main clutch 10 is a friction clutch with a minimum amount of friction surface and maximum spring pressure, the force of a light spring being transferred to the friction members through power transmitting and multiplying members or levers. The clutch is thrown out by means acting directly against the light spring. The levers permit a comparatively light spring to be used and serve to multiply the power to the comparatively small friction surface of the clutch. The comparatively small light spring is readily operated from the clutch pedal without appreciable effort on the part of the operator.

The main clutch here shown is a single plate clutch and includes generally, a disk or plate 16 having a hub 17 mounted on the shaft 2 to slide axially thereof, a pressure ring 18 rotatable with the fly wheel 9 and also shiftable axially of the ring pressing against the margin of the plate, a throw-out sleeve 19 slidable axially of the driving shaft 2 and having a throw-out bearing 20 at its rear end, this sleeve coacting with a spring abutment 21 against which the main spring 22 thrusts. The power of the spring is transferred to the pressure ring through a series of levers 23 fulcrumed at their outer ends on an annular fulcrum ring 24 rotatable with the fly wheel and bearing near their outer ends against an annular bearing face 25 on the pressure ring and coacting at their inner ends with the abutment 21. The spring 22 is interposed between the abutment 21 and a second abutment 26 on the rear end of a hub 27 of the pressure ring which hub encircles the throw-out sleeve 19.

The power of the spring is transferred through the multiplying levers 23 to the friction plate 16. Disks 28 of friction material are mounted on the plate on opposite sides thereof. Obviously, the clutch has comparatively little friction surface and a comparatively light spring but the force of the spring is multiplied through the levers so that the friction between the friction surfaces is increased to such an amount as to use a comparatively small clutch to transmit a comparatively great torque.

The throw-out collar 20 is operated by the usual yoke 29 mounted on a rock shaft 30, the shaft having the usual lever or clutch pedal 31 thereon.

The rear clutch 14 is here shown as comprising positive and friction sections, and this clutch 14 as here illustrated comprises outer and inner drums 32, 33 located within the casing 12, the inner drum 33 being mounted on or formed integral with the rear end of the driven shaft 3 and the outer drum 32 having its hub splined to the shaft 11 to rotate therewith and slide axially thereof.

Sets of interleaved friction disks 35 are interposed between the drums and these disks are compressed by a spring pressed pressure plate 36 within the outer drum 32, the springs 37 being interposed between the head of the drum 32 and the bottoms or sockets provided in the pressure plate 36. A positive clutch section is also splined to the shaft to rotate therewith and slide thereon, this positive clutch section 40 being located within the drum 33 and having peripheral teeth which interlock with internal teeth on the drum 33. The positive clutch section 40 has a sleeve enclosing the shaft 11 and extending to the rear of the drum 32, this sleeve being designated 41 and having suitable slots 42 therein through which project splines 43 on the hub of the drum 32 which splines interlock with complemental splines on the shaft 11, that is, the outer drum 32 is splined to the shaft 11 through slots in the sleeve 41 of the positive clutch section 40 and the hub of this outer drum 32 encircles said sleeve 41.

The rear clutch 14 is operated by means of a throw-out collar 44 connected to the rear end of the sleeve 41, a fork 45 coacting with said collar, the fork being mounted upon a rock shaft 46 journalled in the case 12. This shaft 46 has a rock arm 47 thereon at its outer end and the rock arm is actuated through connections between the clutch pedal 31 and the rock arm 47. Obviously, as the throw-out collar is moved to the left in Figure 1, the clutch head 40 will be moved to the left, first disengaging the teeth thereof from the internal teeth of the drum 33 and thereafter the head 40 will engage the pressure plate 36 at 36ª and withdraw the pressure plate against the action of the springs 37 thus entirely releasing the rear clutch, first disengaging the positive section and then the friction section. These sections are engaged in the reverse order, that is, the friction section first engages and then the positive section.

The connections between the clutch pedal 31 or the shaft 30 on which it is mounted and the lever 47 for the rear throw-out shaft 46, as here shown comprise a lever or arm 48 mounted on the throw-out shaft 30 for the main clutch, a link 49 connecting the rock arm 48 and a rock arm 50 pivoted at 51 on the outer side of the case 12, the rock arm 50 having a cam 52 coacting with the cam follower as a roller 53 associated with the rock arm 47. This cam 52 has an idle portion 54 and a lift portion 55 and an idle portion 56 at the top of the lift portion, the idle portion 54 constituting a lost motion connection by means of which the front clutch can be initially thrown out before the lift portion 55 begins to act on the roller 53 to throw out the rear clutch. The arm 47 is acted upon by a spring 57 which causes the follower to follow the cam.

During gear shifting operations, the front clutch having a comparatively small friction surface and a comparatively light spring against which the clutch pedal acts directly to throw out the clutch, is disengaged with a minimum effort and also on account of the lost motion connection, no appreciable effort is added to throw out the rear clutch. Thus, the shifting of the gears by the lever 6 is effected while the transmission is wholly disconnected from any driving force either from the engine or from the propeller shaft of the vehicle and further a rear clutch of sufficient capacity or size to carry the torque or load can be used without the addition of any appreciable operating effort.

What I claim is:

In a transmission mechanism, the combination of driving and driven shafts, a normally engaged clutch for connecting and disconnecting the shafts, the clutch comprising coacting friction sections and coacting positive sections, one of the positively engaged sections and one of the friction sections being shiftable and operable successively, whereby the positive sections disengage in advance of the friction sections and the sections reengage in the reverse order, throw-out means for one of the shiftable positive sections of the clutch and means between the shiftable sections whereby the positive shiftable section picks up the shiftable friction section during the throwing out of the clutch, spring means to shift the shiftable friction section into engaged position when not held disengaged by the positive section and operating means for the throw-out means comprising a rock arm having a cam follower thereon, connections between the rock arm and the shiftable positive clutch section, a rocking cam coacting with the follower and a spring connected to the rock arm which carries the cam follower to hold the cam follower engaged with the cam and to hold the positive shiftable clutch section in its engaged position.

In testimony whereof, I have hereunto signed my name, at Syracuse, in the county of Onondaga and State of New York, this 26th day of February, 1926.

GEORGE C. CARHART.